(12) United States Patent
Kim et al.

(10) Patent No.: US 9,933,048 B1
(45) Date of Patent: Apr. 3, 2018

(54) PLANETARY GEAR TRAIN OF AUTOMATIC TRANSMISSION FOR VEHICLE

(71) Applicant: HYUNDAI MOTOR COMPANY, Seoul (KR)

(72) Inventors: Jin Ho Kim, Suwon-si (KR); Dong Hwan Hwang, Seoul (KR); Jong Sool Park, Hwaseong-si (KR); Jong Soo Kim, Seoul (KR); Kyeong Hun Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/425,620

(22) Filed: Feb. 6, 2017

(30) Foreign Application Priority Data

Jan. 13, 2017 (KR) .................. 10-2017-0006059

(51) Int. Cl.
*F16H 3/66* (2006.01)

(52) U.S. Cl.
CPC ....... *F16H 3/66* (2013.01); *F16H 2200/0069* (2013.01); *F16H 2200/2015* (2013.01); *F16H 2200/2046* (2013.01)

(58) Field of Classification Search
CPC ............... F16H 3/66; F16H 2200/2046; F16H 2200/2015; F16H 2200/0069
USPC .......................................... 475/275–291, 330
See application file for complete search history.

(56) References Cited

U.S. PATENT DOCUMENTS

| | | | | |
|---|---|---|---|---|
| 9,163,705 | B1* | 10/2015 | Hwang | ............. F16H 3/666 |
| 2005/0137050 | A1* | 6/2005 | Winzeler | ............. F16H 3/66 475/296 |
| 2014/0004991 | A1* | 1/2014 | Koch | ............. F16H 3/66 475/276 |
| 2014/0038765 | A1* | 2/2014 | Koch | ............. F16H 3/64 475/276 |

(Continued)

FOREIGN PATENT DOCUMENTS

| | | | | |
|---|---|---|---|---|
| SU | 1105711 A1 * | 7/1984 | ............. | F16H 3/66 |
| WO | WO 2011026833 A1 * | 3/2011 | ............. | F16H 3/66 |

OTHER PUBLICATIONS

English translation of WO2011026833A1, translationportal.epo.org, Jul. 1, 2017.*

(Continued)

*Primary Examiner* — Roger L Pang
(74) *Attorney, Agent, or Firm* — Brinks Gilson & Lione (57) ABSTRACT

A planetary gear train of an automatic transmission for a vehicle is disclosed. The planetary gear train may include: an input shaft receiving torque from an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a fifth planetary gear set including thirteenth, fourteenth, and fifteenth rotation elements. In addition, the planetary gear train includes nine shafts operably connected to at least of the rotation elements to provide ten forward speed stages and one reverse speed stage so that more efficient power delivery performance and smooth speed stage change are achieved.

19 Claims, 6 Drawing Sheets

(56) References Cited

U.S. PATENT DOCUMENTS

| | | | | |
|---|---|---|---|---|
| 2014/0038766 A1* | 2/2014 | Koch | ............................. | F16H 3/66 475/276 |
| 2016/0169349 A1* | 6/2016 | Park | ............................. | F16H 3/666 475/275 |
| 2016/0169350 A1* | 6/2016 | Park | ............................. | F16H 3/666 475/275 |
| 2016/0169351 A1* | 6/2016 | Lee | ............................. | F16H 3/666 475/275 |
| 2016/0169352 A1* | 6/2016 | Lee | ............................. | F16H 3/666 475/275 |

OTHER PUBLICATIONS

English Translation of SU1105711A1; http://www.translationportal.epo.org; Nov. 7, 2017 (Year: 2017).*

* cited by examiner

| speed stages | engaging elements ||||||  gear ratio | step ratio | note |
|---|---|---|---|---|---|---|---|---|---|
|  | C1 | C2 | C3 | B1 | B2 | B3 | | | |
| D1 |  |  | ● |  |  | ● | 5.471 |  | |
| D2 |  |  | ● | ● |  | ● | 3.440 | 1.590 | |
| D3 |  | ● |  |  | ● | ● | 2.522 | 1.364 | |
| D4 |  | ● | ● |  | ● | ● | 1.933 | 1.305 | gear ratio span : 9.8 |
| D5 | ● | ● |  |  |  | ● | 1.650 | 1.172 | ratio of REV/D1 : 0.71 |
| D6 | ● |  | ● |  |  | ● | 1.262 | 1.307 | |
| D7 | ● | ● | ● |  |  |  | 1.000 | 1.262 | |
| D8 | ● |  | ● |  | ● |  | 0.854 | 1.171 | |
| D9 | ● | ● |  |  | ● |  | 0.652 | 1.310 | |
| D10 | ● |  |  | ● |  |  | 0.559 | 1.166 | |
| REV |  |  |  | ● |  | ● | -3.893 | - | |

FIG. 3

| speed stages | engaging elements |  |  |  |  |  | gear ratio | step ratio | note |
|---|---|---|---|---|---|---|---|---|---|
| | C1 | C2 | C3 | B1 | B2 | B3 | | | |
| D1 | | | ● | ● | | ● | 6.194 | | |
| D2 | ● | | | ● | | ● | 3.899 | 1.589 | |
| D3 | ● | ● | | | ● | ● | 2.864 | 1.361 | |
| D4 | ● | ● | ● | | | ● | 2.01 | 1.425 | |
| D5 | ● | ● | | | | ● | 1.558 | 1.290 | gear ratio span : 9.9 |
| D6 | ● | ● | ● | | | ● | 1.281 | 1.216 | ratio of REV/D1 : 0.6 |
| D7 | ● | | ● | | | | 1.000 | 1.281 | |
| D8 | ● | ● | | | ● | | 0.862 | 1.160 | |
| D9 | ● | ● | | | ● | | 0.731 | 1.179 | |
| D10 | | ● | | ● | | | 0.626 | 1.168 | |
| REV | ● | | | ● | | ● | -3.700 | - | |

| speed stages | engaging elements ||||||  gear ratio | step ratio | note |
|---|---|---|---|---|---|---|---|---|
| | C1 | C2 | C3 | B1 | B2 | B3 | | | |
| D1 | | | ● | ● | | ● | 4.859 | 1.547 | gear ratio span : 8.6 ratio of REV/D1 : 0.84 |
| D2 | ● | | ● | | ● | ● | 3.140 | 1.321 | |
| D3 | ● | ● | | | ● | ● | 2.377 | 1.320 | |
| D4 | ● | ● | ● | | | ● | 1.801 | 1.163 | |
| D5 | ● | ● | | | | ● | 1.548 | 1.250 | |
| D6 | ● | | ● | | | ● | 1.238 | 1.238 | |
| D7 | ● | ● | ● | | | | 1.000 | 1.181 | |
| D8 | ● | ● | | | ● | | 0.847 | 1.289 | |
| D9 | ● | ● | | | ● | | 0.657 | 1.165 | |
| D10 | ● | | | ● | | | 0.564 | - | |
| REV | ● | | | ● | | ● | -4.065 | | |

FIG. 6

| speed stages | engaging elements ||||| gear ratio | step ratio | note |
|---|---|---|---|---|---|---|---|---|
| | C1 | C2 | C3 | B1 | B2 | B3 | | | |
| D1 | | | ● | ● | | ● | 5.483 | | gear ratio span : 8.5<br>ratio of REV/D1 : 0.68 |
| D2 | ● | ● | | ● | | ● | 3.626 | 1.512 | |
| D3 | ● | ● | | | ● | ● | 2.660 | 1.363 | |
| D4 | ● | ● | ● | | | ● | 1.865 | 1.426 | |
| D5 | ● | ● | | | | ● | 1.460 | 1.277 | |
| D6 | ● | ● | ● | | | ● | 1.230 | 1.187 | |
| D7 | ● | | ● | | | | 1.000 | 1.230 | |
| D8 | ● | ● | | | ● | | 0.872 | 1.147 | |
| D9 | | ● | | | ● | | 0.747 | 1.167 | |
| D10 | | | | ● | | | 0.645 | 1.158 | |
| REV | ● | | | ● | | ● | -3.710 | - | |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2017-0006059, filed on Jan. 13, 2017, the entire contents of which are incorporated herein by reference.

FIELD

The present disclosure relates to an automatic transmission for a vehicle that improves power delivery performance and fuel economy.

BACKGROUND

The statements in this section merely provide background information related to the present disclosure and may not constitute prior art.

Generally, an automatic transmission achieving more speed stages has been developed to enhance fuel efficiency and drivability.

Such an automatic transmission with more speed stages is desired to improve power performance and driving efficiency while pursuing the engine-downsizing. Particularly, highly efficient multiple-speeds transmissions are desired to have excellent linearity of step ratios which is closely related to drivability such as acceleration before and after shift and rhythmical engine speed. These features are considered to secure competitiveness in automatic transmission field.

However, in the automatic transmission, as the number of speed stages increase, the number of internal components increase, and as a result, mountability, cost, weight, transmission efficiency, and the like may still deteriorate.

Accordingly, development of a planetary gear train which may have a small number of components may be important in order to increase a fuel efficiency.

A conventional eight-speed automatic transmission has gear ratio span of 6.5-7.5 (gear ratio span is an important factor for securing linearity of step ratios), and thus improvement of power performance and fuel economy may not be great.

In addition, if an eight-speed automatic transmission has gear ratio span greater than 9.0, it is hard to secure linearity of step ratios. Therefore, driving efficiency of an engine and drivability of a vehicle may be deteriorated.

The above information disclosed in this Background section is only for enhancement of understanding of the background of the present disclosure and therefore it may contain information that does not form the prior art that is already known in this country to a person of ordinary skill in the art.

SUMMARY

The present disclosure provides a planetary gear train of an automatic transmission for a vehicle having advantages of improving power delivery performance and fuel efficiency through ten forward speed stages and one reverse speed stage and reducing drag loss of clutches and brakes using five planetary gear sets and six engaging elements.

Another form of the present disclosure provides a planetary gear train of an automatic transmission for a vehicle having further advantages of improving torque delivery efficiency and durability by using a planetary gear set in torque parallel type and reducing torque share of each planetary gear set and each engaging element.

Moreover the present disclosure provides a high-efficiency planetary gear train of an automatic transmission for a vehicle having further advantages of increasing flexibility of output gear ratios and improving linearity of step ratios by using five planetary gear sets for achieving ten forward speed stages and one reverse speed stage.

A planetary gear train of an automatic transmission for a vehicle according to one exemplary form of the present disclosure may include: an input shaft receiving torque from an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a fifth planetary gear set including thirteenth, fourteenth, and fifteenth rotation elements; a first shaft connected to the first rotation element and the input shaft; a second shaft connected to the fourteenth rotation element and the output shaft; a third shaft connected to the sixth rotation element and the thirteenth rotation element; a fourth shaft connected to the eleventh rotation element and the fifteenth rotation element; a fifth shaft connected to the fifth rotation element and the eighth rotation element; a sixth shaft connected to the ninth rotation element; a seventh shaft connected to the third rotation element, the seventh rotation element, and the tenth rotation element; an eighth shaft connected to the second rotation element and the fourth rotation element; and a ninth shaft connected to the twelfth rotation element.

In addition, the planetary gear train may further include six engaging elements selectively connecting any one shaft of the nine shafts to another shaft or to a transmission housing, wherein each of forward speeds or a reverse speed is achieved by operating three engaging elements among the six engaging elements.

In addition, the six engaging elements may include three clutches and three brakes, and each of the three clutches is configured to connect two shafts each other among the nine shafts. Each of the three brakes is configured to selectively connect the transmission housing to another shaft of the nine shafts that is not connected with the input shaft or the output shaft.

In addition, the six engaging elements may include: a first clutch disposed between the sixth shaft and the second shaft; a second clutch disposed between the first shaft and the fifth shaft; a third clutch disposed between the first shaft and the third shaft; a first brake disposed between the eighth shaft and the transmission housing; a second brake disposed between the seventh shaft and the transmission housing; and a third brake disposed between the ninth shaft and the transmission housing.

The six engaging elements may include: a first clutch disposed between the sixth shaft and the fourth shaft; a second clutch disposed between the first shaft and the fifth shaft; a third clutch disposed between the first shaft and the third shaft; a first brake disposed between the eighth shaft and the transmission housing; a second brake disposed between the seventh shaft and the transmission housing; and a third brake disposed between the ninth shaft and the transmission housing.

In addition, the first, second, and third rotation elements may be a first sun gear, a first planet carrier, and a first ring gear respectively, the fourth, fifth, and sixth rotation elements may be a second sun gear, a second planet carrier, and a second ring gear respectively, the seventh, eighth, and ninth rotation elements may be a third sun gear, a third planet carrier, and a third ring gear respectively, the tenth, eleventh, and twelfth rotation elements may be a fourth sun gear, a fourth planet carrier, and a fourth ring gear respectively, and the thirteenth, fourteenth, and fifteenth rotation elements may be a fifth sun gear, a fifth planet carrier, and a fifth ring gear respectively.

In addition, the first, second, third, fourth, and fifth planetary gear sets may be disposed in a sequence of the first, fourth, third, second, and fifth planetary gear sets from an engine side.

According to an exemplary form of the present disclosure, ten forward speed stages and one reverse speed stage may be achieved by combining five planetary gear sets being simple planetary gear sets with six engaging elements.

In addition, since gear ratio span greater than 8.5 is provided, driving efficiency of the engine may be increased. In addition, since linearity of step ratios can be provided for multiple speed stages, drivability such as acceleration before and after shift, rhythmical engine speed, and so on may be improved.

In addition, since ten forward speed stages and one reverse speed stages are achieved by using five planetary gear sets but the number of engaging elements is reduced, drag loss of clutches and brakes may be reduced and power delivery efficiency and fuel efficiency may be improved.

In addition, since a planetary gear set on an output side in torque parallel type is used and torque is evenly shared to each planetary gear set and each engaging element, and thus torque delivery efficiency and durability may be improved.

In addition, since five planetary gear sets are used to achieve ten forward speed stages and one reverse speed stage, flexibility of output gear ratios may be increased and linearity of step ratios may be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings.

However, parts which are not related with the description are omitted for clearly describing the exemplary forms of the present disclosure.

In the following description, dividing names of components into first, second, and the like is to divide the names because the names of the components are the same as each other and an order thereof is not particularly limited.

Figure 1:
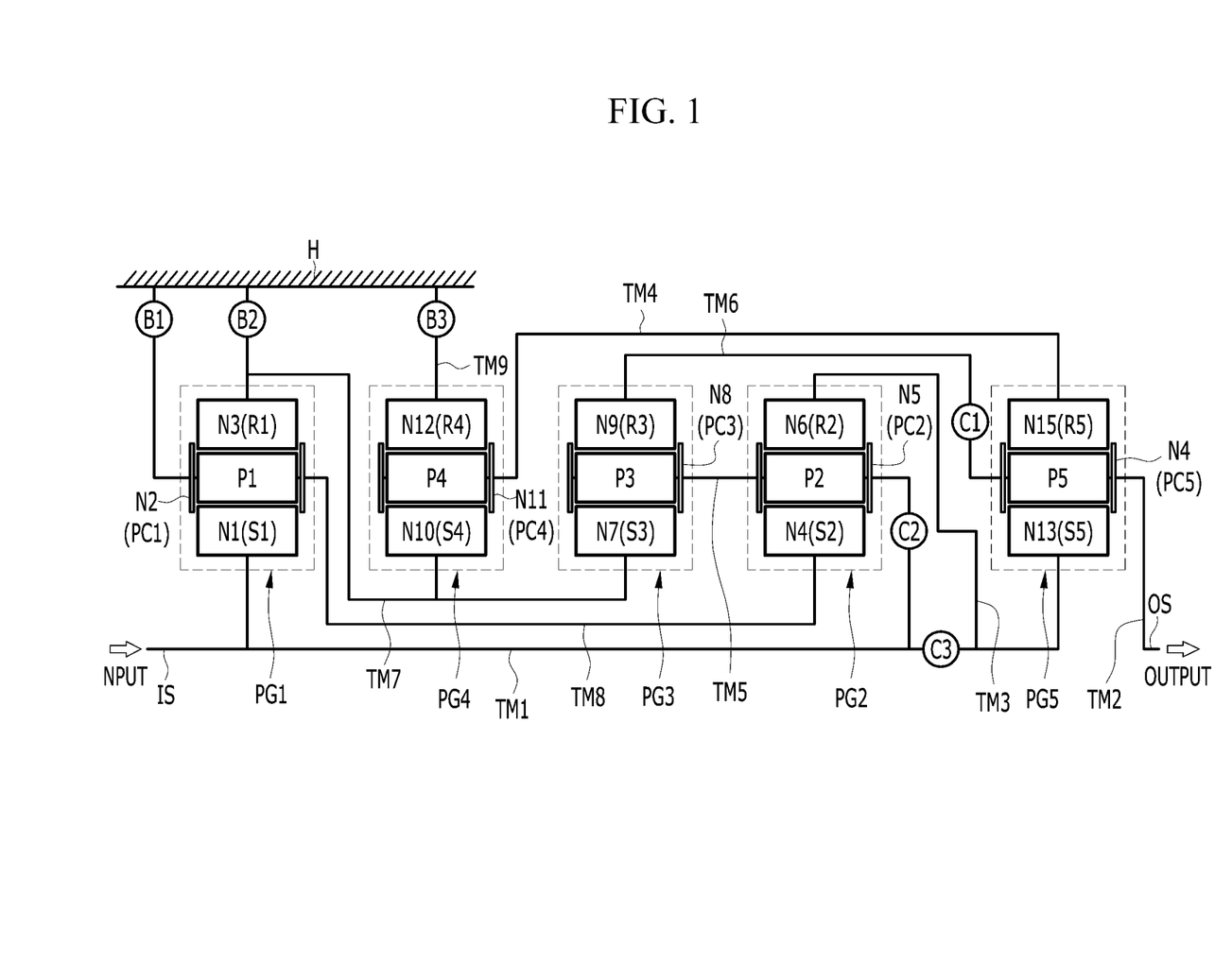
FIG. 1 is a schematic diagram of a planetary gear train according to the first exemplary form of the present disclosure.

FIG. 1 is a schematic diagram of a planetary gear train according to the first exemplary form of the present disclosure.

Referring to FIG. 1, a planetary gear train includes: first, second, third, fourth, and fifth planetary gear sets PG1, PG2, PG3, PG4, and PG5 disposed on the same axis; an input shaft IS; and output shaft OS; nine shafts TM1 to TM9 connected to at least one rotation element of the first, second, third, fourth, and fifth planetary gear sets (i.e., PG1, PG2, PG3, PG4, and PG5); engaging elements including three clutches C1 to C3 and three brakes B1 to B3; and a transmission housing H.

Torque input from an engine to the input shaft IS is changed by cooperation of the first, second, third, fourth, and fifth planetary gear sets PG1, PG2, PG3, PG4, and PG5, and the changed torque is output through the output shaft OS.

According to the first exemplary form of the present disclosure, the planetary gear sets are disposed in a sequence of the first, fourth, third, second, and fifth planetary gear sets PG1, PG4, PG3, PG2, and PG5 from the engine.

The input shaft IS is an input member and torque from a crankshaft of the engine is torque-converted through a torque converter to be input into the input shaft IS.

The output shaft OS is an output member, is disposed on the same axis with the input shaft IS, and transmits driving torque to a driving wheel through a differential apparatus.

The first planetary gear set PG1 is a single pinion planetary gear set and includes: a first sun gear S1 being a first rotation element N1, a first planet carrier PC1 being a second rotation element N2 and rotatably supporting a first pinion gear P1 engaged with the first sun gear S1 of the first rotation element N1, and a first ring gear R1 being a third rotation element N3 and engaged with the first pinion gear P1.

The second planetary gear set PG2 is a single pinion planetary gear set and includes: a second sun gear S2 being a fourth rotation element N4, a second planet carrier PC2 being a fifth rotation element N5 and rotatably supporting a second pinion gear P2 engaged with the second sun gear S2 of the fourth rotation element N4, and a second ring gear R2 being a sixth rotation element N6 and engaged with the second pinion gear P2.

The third planetary gear set PG3 is a single pinion planetary gear set and includes: a third sun gear S3 being a seventh rotation element N7, a third planet carrier PC3 being an eighth rotation element N8 and rotatably supporting a third pinion gear P3 engaged with the third sun gear S3 of the seventh rotation element N7, and a third ring gear R3 being a ninth rotation element N9 and engaged with the third pinion gear P3.

The fourth planetary gear set PG4 is a single pinion planetary gear set and includes: a fourth sun gear S4 being a tenth rotation element N10, a fourth planet carrier PC4 being an eleventh rotation element N11 and rotatably supporting a fourth pinion gear P4 engaged with the fourth sun gear S4 of the tenth rotation element N10, and a fourth ring gear R4 being a twelfth rotation element N12 engaged with the fourth pinion gear P4.

The fifth planetary gear set PG5 is a single pinion planetary gear set and includes: a fifth sun gear S5 being a thirteenth rotation element N13, a fifth planet carrier PC5 being a fourteenth rotation element N14 and rotatably supporting a fifth pinion gear P5 engaged with the fifth sun gear S5 of the thirteenth rotation element N13, and a fifth ring gear R5 being a fifteenth rotation element N15 engaged with the fifth pinion gear P5.

The second rotation element N2 is directly connected to the fourth rotation element N4, the third rotation element N3 is directly connected to the seventh rotation element N7 and the tenth rotation element N10, the fifth rotation element N5 is directly connected to the eighth rotation element N8, the sixth rotation element N6 is directly connected to the thirteenth rotation element N13, and the eleventh rotation element N11 is directly connected to the fifteenth rotation element N15 such that the first, second, third, fourth, and fifth planetary gear sets PG1, PG2, PG3, PG4, and PG5 are operated with nine shafts TM1 to TM9.

The nine shafts TM1 to TM9 will be described in further detail.

The nine shafts TM1 to TM9 may directly connect rotation elements to each other among the rotation elements of the planetary gear sets PG1, PG2, PG3, PG4, and PG5. The nine shafts TM1 to TM9 may be rotation members that are connected to any one rotation element and rotate with the any one rotation element to transmit torque, or rotation members that selectively connect any one rotation element to the transmission housing H. In one form, the nine shafts TM1 to TM9 may be fixed members that directly connect any one rotation element to the transmission housing H.

The first shaft TM1 is directly connected to the first rotation element N1 (first sun gear S1) and is directly connected to the input shaft IS so as to be always operated as an input element.

The second shaft TM2 is directly connected to the fourteenth rotation element N14 (fifth planet carrier PC5) and is directly connected to the output shaft OS so as to be always operated as an output element.

The third shaft TM3 is directly connected to the sixth rotation element N6 (second ring gear R2) and the thirteenth rotation element N13 (fifth sun gear S5).

The fourth shaft TM4 is directly connected to the eleventh rotation element N11 (fourth planet carrier PC4) and the fifteenth rotation element N15 (fifth ring gear R5).

The fifth shaft TM5 is directly connected to the fifth rotation element N5 (second planet carrier PC2) and the eighth rotation element N8 (third planet carrier PC3).

The sixth shaft TM6 is directly connected to the ninth rotation element N9 (third ring gear R3).

The seventh shaft TM7 is directly connected to the third rotation element N3 (first ring gear R1), the seventh rotation element N7 (third sun gear S3), and the tenth rotation element N10 (fourth sun gear S4).

The eighth shaft TM8 is directly connected to the second rotation element N2 (first planet carrier PC1) and the fourth rotation element N4 (second sun gear S2).

The ninth shaft TM9 is directly connected to the twelfth rotation element N12 (fourth ring gear R4).

Herein, the second shaft TM2 is selectively connected to the sixth shaft TM6, and each of the third shaft TM3 and the fifth shaft TM5 is selectively connected to the first shaft TM1 so as to be operated as a selective input element.

In addition, each of the seventh shaft TM7, the eighth shaft TM8, and the ninth shaft TM9 is selectively connected to the transmission housing H so as to be operated as a selective fixed element.

Three clutches C1, C2, and C3 that are engaging elements are disposed at portions at which any two shafts among the nine shafts TM1 to TM9 including the input shaft IS and the output shaft OS are selectively connected to each other.

In addition, three brakes B1, B2, and B3 that are engaging elements are disposed at portions at which any one shaft among the nine shafts TM1 to TM9 is selectively connected to the transmission housing H.

Arrangement of the six engaging elements (three clutches C1 to C3 and three brakes B1 to B3) will be described in detail.

The first clutch C1 is disposed between the second shaft TM2 and the sixth shaft TM6 and selectively connects the second shaft TM2 to the sixth shaft TM6.

The second clutch C2 is disposed between the first shaft TM1 and the fifth shaft TM5 and selectively connects the first shaft TM1 to the fifth shaft TM5.

The third clutch C3 is disposed between the first shaft TM1 and the third shaft TM3 and selectively connects the first shaft TM1 to the third shaft TM3.

The first brake B1 is disposed between the eighth shaft TM8 and the transmission housing H and selectively connects the eighth shaft TM8 to the transmission housing H.

The second brake B2 is disposed between the seventh shaft TM7 and the transmission housing H and selectively connects the seventh shaft TM7 to the transmission housing H.

The third brake B3 is disposed between the ninth shaft TM9 and the transmission housing H and selectively connects the ninth shaft TM9 to the transmission housing H.

Referring to FIG. 1, it is illustrated that the second clutch C2 and the third clutch C3 are selectively connects the fifth shaft TM5 and the third shaft TM3 to the first shaft TM1, respectively. Since the first shaft TM1 is directly connected to the input shaft IS, the second clutch C2 may be configured to selectively connect the input shaft IS to the fifth shaft TM5, and the third clutch C3 may be configured to selectively connect the input shaft IS to the third shaft TM3.

The engaging elements including the first, second, and third clutches (i.e., C1, C2, and C3) and the first, second, and third brakes (i.e., B1, B2, and B3) may be multi-plates friction elements of wet type that are operated by hydraulic pressure.

Figure 2:
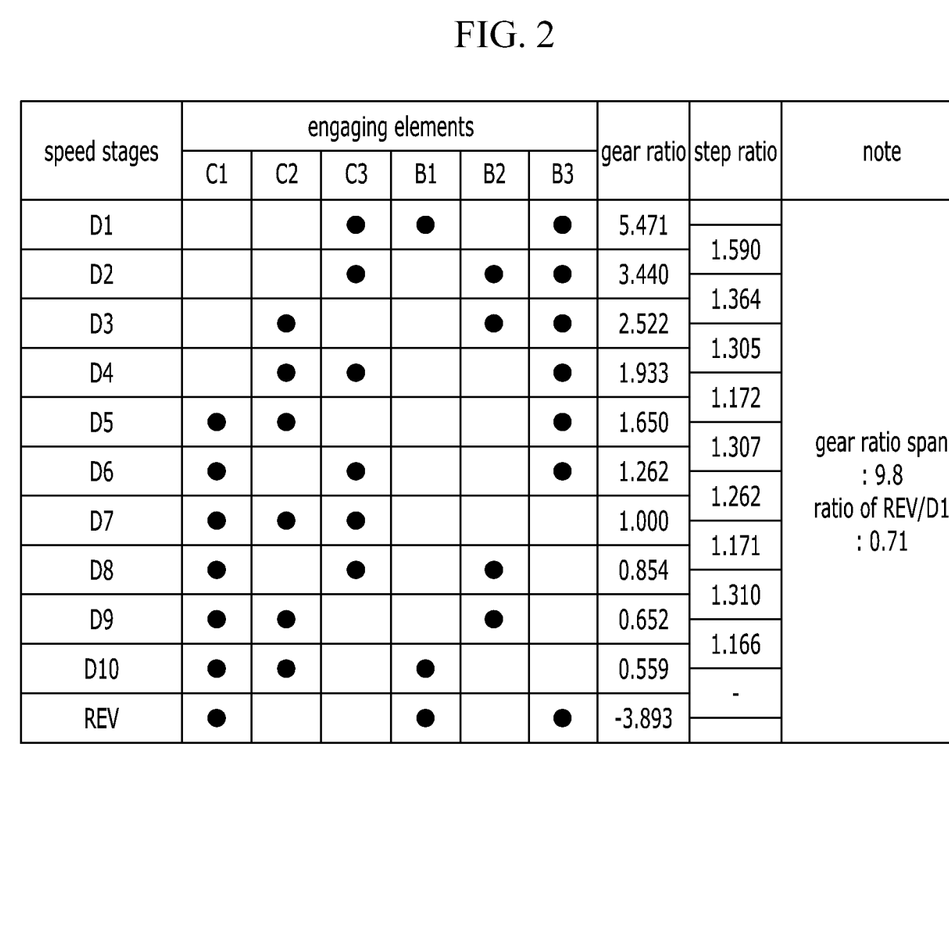
FIG. 2 is one example of an operation chart of control elements at each speed stage in the planetary gear train according to the first exemplary form of the present disclosure.

FIG. 2 is one example of an operation chart of control elements at each speed stage in the planetary gear train in the first exemplary form of the present disclosure.

Referring to FIG. 2, three engaging elements among the first, second, and third clutches C1, C2, and C3 and the first, second, and third brakes B1, B2, and B3 are operated at each speed stage in the planetary gear train.

The third clutch C3 and the first and third brakes B1 and B3 are simultaneously operated at a first forward speed stage D1.

In a state that the first shaft TM1 is connected to the third shaft TM3 by operation of the third clutch C3, torque of the input shaft IS is input into the first shaft TM1 and the third shaft TM3. In addition, the eighth shaft TM8 and the ninth shaft TM9 are operated as the fixed elements by operation of the first and third brakes B1 and B3. Therefore, the torque of the input shaft IS is shifted into the first forward speed stage, and the first forward speed stage is output through the output shaft OS connected with the second shaft TM2.

The third clutch C3 and the second and third brakes B2 and B3 are simultaneously operated at a second forward speed stage D2.

In a state that the first shaft TM1 is connected to the third shaft TM3 by operation of the third clutch C3, the torque of the input shaft IS is input into the first shaft TM1 and the third shaft TM3. In addition, the seventh shaft TM7 and the ninth shaft TM9 are operated as the fixed elements by operation of the second and third brakes B2 and B3. Therefore, the torque of the input shaft Is is shifted into the second forward speed stage, and the second forward speed stage is output through the output shaft OS connected with the second shaft TM2.

The second clutch C2 and the second and third brakes B2 and B3 are simultaneously operated at a third forward speed stage D3.

In a state that the first shaft TM1 is connected to the fifth shaft TM5 by operation of the second clutch C2, the torque of the input shaft IS is input into the first shaft TM1 and the fifth shaft TM5. In addition, the seventh shaft TM7 and the ninth shaft TM9 are operated as the fixed elements by operation of the second and third brakes B2 and B3. Therefore, the torque of the input shaft IS is shifted into the third forward speed stage, and the third forward speed stage is output through the output shaft OS connected with the second shaft TM2.

The second and third clutches C2 and C3 and the third brake B3 are simultaneously operated at a fourth forward speed stage D4.

In a state that the first shaft TM1 is connected to the fifth shaft TM5 by operation of the second clutch C2 and the first shaft TM1 is connected to the third shaft TM3 by operation of the third clutch C3, the torque of the input shaft IS is input into the first shaft TM1, the fifth shaft TM5, and the third shaft TM3. In addition, the ninth shaft TM9 is operated as the fixed element by operation of the third brake B3. Therefore, the torque of the input shaft IS is shifted into the fourth forward speed stage, and the fourth forward speed stage is output through the output shaft OS connected with the second shaft TM2.

The first and second clutches C1 and C2 and the third brake B3 are simultaneously operated at a fifth forward speed stage D5.

In a state that the second shaft TM2 is connected to the sixth shaft TM6 by operation of the first clutch C1 and the first shaft TM1 is connected to the fifth shaft TM5 by operation of the second clutch C2, the torque of the input shaft IS is input into the first shaft TM1 and the fifth shaft TM5. In addition, the ninth shaft TM9 is operated as the fixed element by operation of the third brake B3. Therefore, the torque of the input shaft IS is shifted into the fifth forward speed stage, and the fifth forward speed stage is output through the output shaft OS connected with the second shaft TM2.

The first and third clutches C1 and C3 and the third brake B3 are simultaneously operated at a sixth forward speed stage D6.

In a state that the second shaft TM2 is connected to the sixth shaft TM6 by operation of the first clutch C1 and the first shaft TM1 is connected to the third shaft TM3 by operation of the third clutch C3, the torque of the input shaft IS is input into the first shaft TM1 and the third shaft TM3. In addition, the ninth shaft TM9 is operated as the fixed element by operation of the third brake B3. Therefore, the torque of the input shaft IS is shifted into the sixth forward speed stage, and the sixth forward speed stage is output through the output shaft OS connected with the second shaft TM2.

The first, second, and third clutches C1, C2, and C3 are simultaneously operated at a seventh forward speed stage D7.

If the second shaft TM2 is connected to the sixth shaft TM6 by operation of the first clutch C1, the first shaft TM1 is connected to the fifth shaft TM5 by operation of the second clutch C2, and the first shaft TM1 is connected to the third shaft TM3 by operation of the third clutch C3, all the planetary gear sets become lock-up states. In this state, if the torque of the input shaft IS is input into the first shaft TM1, the fifth shaft TM5, and the third shaft TM3, the torque of the input shaft IS is not changed and the seventh forward speed stage is output through the output shaft OS connected with the second shaft TM2.

The first and third clutches C1 and C3 and the second brake B2 are simultaneously operated at an eighth forward speed stage D8.

In a state that the second shaft TM2 is connected to the sixth shaft TM6 by operation of the first clutch C1 and the first shaft TM1 is connected to the third shaft TM3 by operation of the third clutch C3, the torque of the input shaft IS is input into the first shaft TM1 and the third shaft TM3. In addition, the seventh shaft TM7 is operated as the fixed element by operation of the second brake B2. Therefore, the torque of the input shaft IS is shifted into the eighth forward speed stage, and the eighth forward speed stage is output through the output shaft OS connected with the second shaft TM2.

The first and second clutches C1 and C2 and the second brake B2 are simultaneously operated at a ninth forward speed stage D9.

In a state that the second shaft TM2 is connected to the sixth shaft TM6 by operation of the first clutch C1 and the first shaft TM1 is connected to the fifth shaft TM5 by operation of the second clutch C2, the torque of the input shaft IS is input into the first shaft TM1 and the fifth shaft TM5. In addition, the seventh shaft TM7 is operated as the fixed element by operation of the second brake B2. Therefore, the torque of the input shaft IS is shifted into the ninth forward speed stage, and the ninth forward speed stage is output through the output shaft OS connected with the second shaft TM2.

The first and second clutches C1 and C2 and the first brake B1 are simultaneously operated at a tenth forward speed stage D10.

In a state that the second shaft TM2 is connected to the sixth shaft TM6 by operation of the first clutch C1 and the first shaft TM1 is connected to the fifth shaft TM5 by operation of the second clutch C2, the torque of the input shaft IS is input into the first shaft TM1 and the fifth shaft TM5. In addition, the eighth shaft TM8 is operated as the fixed element by operation of the first brake B1. Therefore, the torque of the input shaft IS is shifted into the tenth forward speed stage, and the tenth forward speed stage is output through the output shaft OS connected with the second shaft TM2.

The first clutch C1 and the first and third brakes B1 and B3 are simultaneously operated at a reverse speed stage REV.

In a state that the second shaft TM2 is connected with the sixth shaft TM6 by operation of the first clutch C1, the torque of the input shaft IS is input into the first shaft TM1. In addition, the eighth shaft TM8 and the ninth shaft TM9 are operated as the fixed elements by operation of the first and third brakes B1 and B3. Therefore, the torque of the input shaft IS is shifted into the reverse speed stage, and the reverse speed stage is output through the output shaft OS connected with the second shaft TM2 as an inverse rotation speed.

Figure 3:
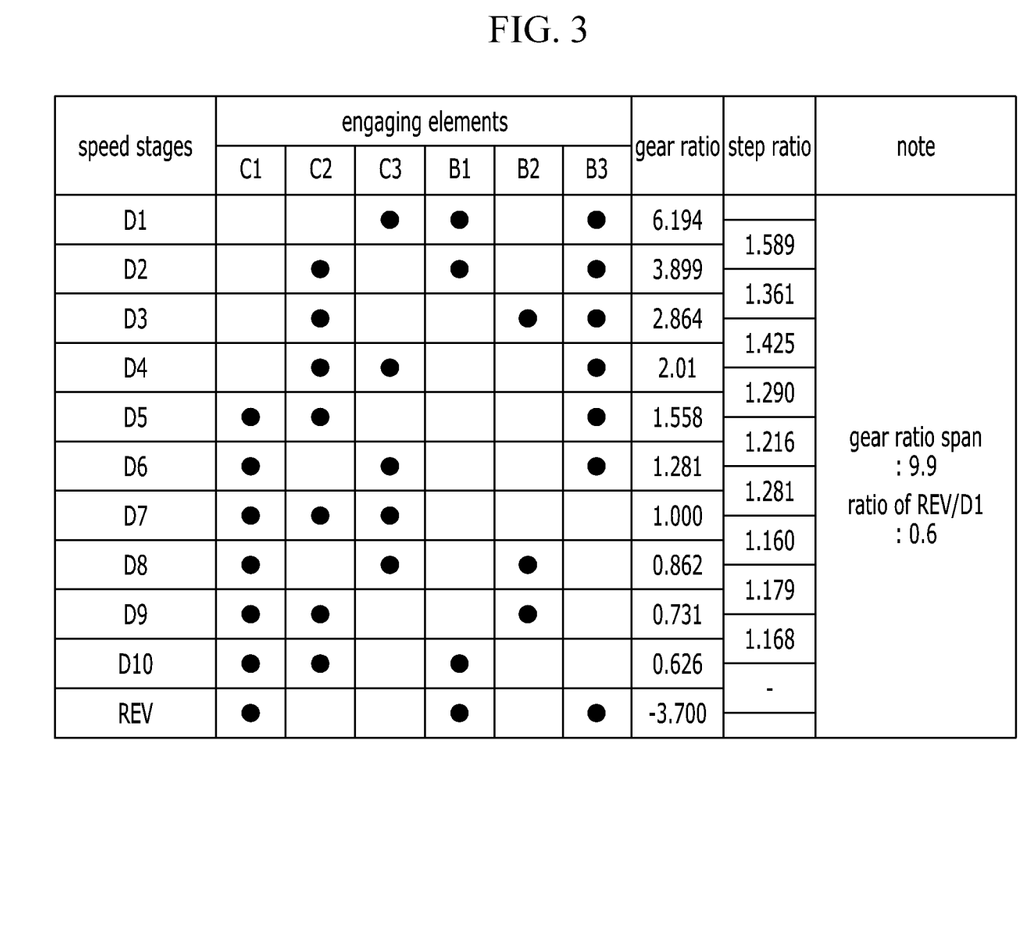
FIG. 3 is another example of an operation chart of control elements at each speed stage in the planetary gear train according to the first exemplary form of the present disclosure.

FIG. 3 is another example of an operation chart of control elements at each speed stage in the planetary gear train according to the first exemplary form of the present disclosure.

Referring to FIG. 3, another example of the operation chart shows that engaging elements at the second forward speed stage D2 are different from those in the one example shown FIG. 2.

That is, referring to FIG. 3, the second clutch C2 and the first and third brakes B1 and B3 are simultaneously operated at the second forward speed stage D2.

In a state that the first shaft TM1 is connected to the fifth shaft TM5 by operation of the second clutch C2, the torque of the input shaft IS is input into the first shaft TM1 and the fifth shaft TM5. In addition, the eighth shaft TM8 and the ninth shaft TM9 are operated as the fixed elements by operation of the first and third brakes B1 and B3. Therefore, the torque of the input shaft IS is shifted into the second forward speed stage, and the second forward speed stage is output through the output shaft OS connected with the second shaft TM2.

At this time, gear ratio of at each speed stage, step ratios, and gear ratio span may be suitably adjusted referring to operation charts shown in FIG. 2 and FIG. 3.

Figure 4:
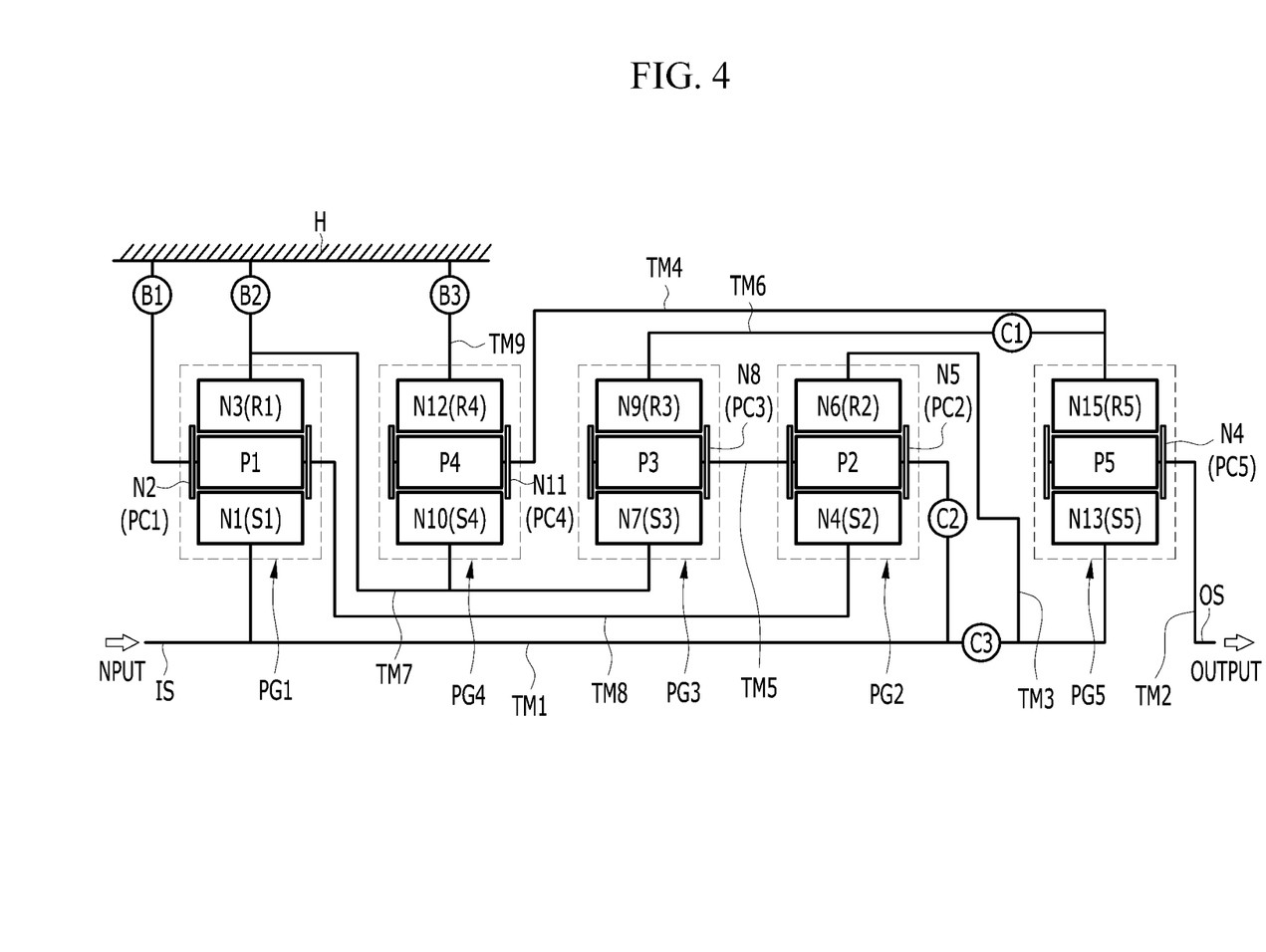
FIG. 4 is a schematic diagram of a planetary gear train according to the second exemplary form of the present disclosure.

FIG. 4 is a schematic diagram of a planetary gear train according to the second exemplary form of the present disclosure.

Referring to FIG. 1 and FIG. 4, the first clutch C1 is disposed between the second shaft TM2 and the sixth shaft TM6 and selectively connects the second shaft TM2 to the sixth shaft TM6 in the planetary gear train according to the first exemplary form of the present disclosure, whereas the first clutch C1 is disposed between the fourth shaft TM4 and the sixth shaft TM6 and selectively connects the fourth shaft TM4 to the sixth shaft TM6 in the planetary gear train according to the second exemplary form of the present disclosure.

Nine shafts TM1 to TM9, arrangements of two clutches C2 and C3 and three brakes B1 to B3, functions, and operations of the second exemplary form are the same as those of the first exemplary form except arrangement of the first clutch C1.

Figure 5:
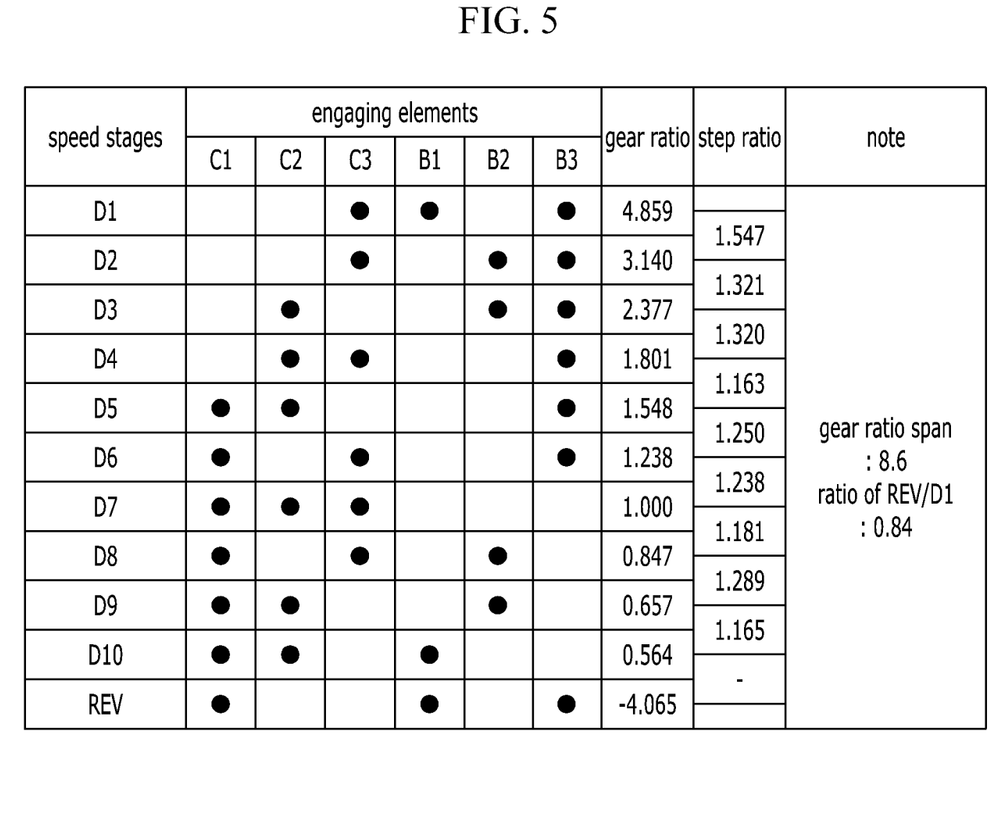
FIG. 5 is one example of an operation chart of control elements at each speed stage in the planetary gear train according to the second exemplary form of the present disclosure.
Figure 6:
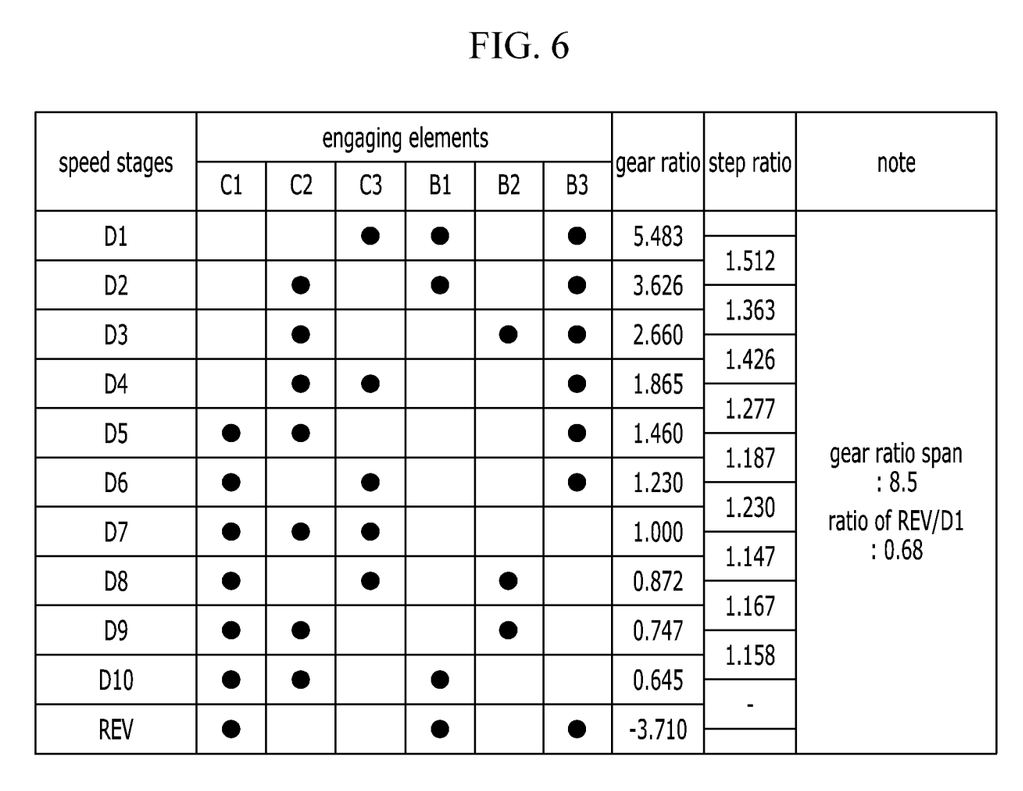
FIG. 6 is another example of an operation chart of control elements at each speed stage in the planetary gear train according to the second exemplary form of the present disclosure.

FIG. 5 and FIG. 6 are two examples of an operation chart of control elements at each speed stage in the planetary gear train according to the second exemplary form of the present disclosure.

Operation charts illustrated in FIG. 5 and FIG. 6 are the same as those illustrated in FIG. 2 and FIG. 3, respectively.

Since arrangement of the first clutch C1 according to the second exemplary form of the present disclosure is different from that according to the first exemplary form, gear ratio of at each speed stage, step ratios, and gear ratio span may be suitably adjusted referring to FIG. 5 and FIG. 6

According to the first and second exemplary forms of the present disclosure, ten forward speed stages and one reverse speed stage may be achieved by using five planetary gear sets PG1, PG2, PG3, PG4, and PG5 and six engaging elements including three clutches C1, C2, and C3 and three brakes B1, B2, and B3.

In addition, since gear ratio span greater than 8.5 is secured, driving efficiency of the engine may be improved. In addition, since linearity of step ratios can be secured due to multiple speed stages, drivability such as acceleration before and after shift, rhythmical engine speed, and so on may be improved.

In addition, since ten forward speed stages and one reverse speed stages are achieved by using the reduced number of engaging elements, drag loss of clutches and brakes may be reduced and thus power delivery efficiency and fuel economy may be improved.

In addition, since a planetary gear set of an output side in torque parallel type is used and torque is evenly shared to each planetary gear set and each engaging element, torque delivery efficiency and durability may be improved.

In addition, since five planetary gear sets are used to achieve ten forward speed stages and one reverse speed stage, flexibility of output gear ratios may be increased and linearity of step ratios may be improved.

While this present disclosure has been described in connection with what is presently considered to be practical forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

PG1, PG2, PG3, PG4, PG5: first, second, third, fourth, and fifth planetary gear sets
S1, S2, S3, S4, S5: first, second, third, fourth, and fifth sun gears
PC1, PC2, PC3, PC4, PC5: first, second, third, fourth, and fifth planet carriers
R1, R2, R3, R4, R5: first, second, third, fourth, and fifth ring gears
C1, C2, C3: first, second, and third clutches
B1, B2, B3: first, second, and third brakes
IS: input shaft
OS: output shaft
TM1, TM2, TM3, TM4, TM5, TM6, TM7, TM8, TM9: first, second, third, fourth, fifth, sixth, seventh, eighth, and ninth shafts

What is claimed is:
1. A planetary gear train of an automatic transmission for a vehicle, the planetary gear train comprising:
   an input shaft configured to receive torque from an engine;
   an output shaft configured to output a changed torque;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set including tenth, eleventh, and twelfth rotation elements;

a fifth planetary gear set including thirteenth, fourteenth, and fifteenth rotation elements;
a first shaft fixedly connected to the first rotation element and the input shaft;
a second shaft fixedly connected to the fourteenth rotation element and the output shaft;
a third shaft fixedly connected to the sixth rotation element and the thirteenth rotation element;
a fourth shaft fixedly connected to the eleventh rotation element and the fifteenth rotation element;
a fifth shaft fixedly connected to the fifth rotation element and the eighth rotation element;
a sixth shaft fixedly connected to the ninth rotation element;
a seventh shaft fixedly connected to the third rotation element, the seventh rotation element, and the tenth rotation element;
an eighth shaft fixedly connected to the second rotation element and the fourth rotation element; and
a ninth shaft fixedly connected to the twelfth rotation element.

2. The planetary gear train of claim 1, further comprising six engaging elements configured to selectively connect to one shaft of the nine shafts to a transmission housing or to another shaft among the nine shafts,
wherein each of forward speeds or a reverse speed is achieved by operating three engaging elements among the six engaging elements.

3. The planetary gear train of claim 2, wherein the six engaging elements comprise three clutches and three brakes, and
wherein each of the three clutches is configured to connect two shafts to each other among the nine shafts, and each of the three brakes is configured to selectively connect the transmission housing to another shaft of the nine shafts that is not connected to the input shaft or the output shaft.

4. The planetary gear train of claim 2, wherein the six engaging elements comprises:
a first clutch disposed between the sixth shaft and the second shaft;
a second clutch disposed between the first shaft and the fifth shaft;
a third clutch disposed between the first shaft and the third shaft;
a first brake disposed between the eighth shaft and the transmission housing;
a second brake disposed between the seventh shaft and the transmission housing; and
a third brake disposed between the ninth shaft and the transmission housing.

5. The planetary gear train of claim 2, wherein the six engaging elements comprise:
a first clutch disposed between the sixth shaft and the fourth shaft;
a second clutch disposed between the first shaft and the fifth shaft;
a third clutch disposed between the first shaft and the third shaft;
a first brake disposed between the eighth shaft and the transmission housing;
a second brake disposed between the seventh shaft and the transmission housing; and
a third brake disposed between the ninth shaft and the transmission housing.

6. The planetary gear train of claim 1, wherein the first, second, and third rotation elements are a first sun gear, a first planet carrier, and a first ring gear respectively,
the fourth, fifth, and sixth rotation elements are a second sun gear, a second planet carrier, and a second ring gear respectively,
the seventh, eighth, and ninth rotation elements are a third sun gear, a third planet carrier, and a third ring gear respectively,
the tenth, eleventh, and twelfth rotation elements are a fourth sun gear, a fourth planet carrier, and a fourth ring gear respectively, and
the thirteenth, fourteenth, and fifteenth rotation elements are a fifth sun gear, a fifth planet carrier, and a fifth ring gear respectively.

7. The planetary gear train of claim 1, wherein the first, second, third, fourth, and fifth planetary gear sets are disposed in a sequence of the first, fourth, third, second, and fifth planetary gear sets from an engine side.

8. A planetary gear train of an automatic transmission for a vehicle, the planetary gear train comprising:
an input shaft configured to receive a torque from an engine;
an output shaft configured to output a torque;
a first planetary gear set including first, second, and third rotation elements;
a second planetary gear set including fourth, fifth, and sixth rotation elements;
a third planetary gear set including seventh, eighth, and ninth rotation elements;
a fourth planetary gear set including tenth, eleventh, and twelfth rotation elements;
a fifth planetary gear set including thirteenth, fourteenth, and fifteenth rotation elements;
a first shaft fixedly connected to the first rotation element and the input shaft;
a second shaft fixedly connected to the fourteenth rotation element and the output shaft;
a third shaft fixedly connected to the sixth rotation element and the thirteenth rotation element;
a fourth shaft fixedly connected to the eleventh rotation element and the fifteenth rotation element;
a fifth shaft fixedly connected to the fifth rotation element and the eighth rotation element;
a sixth shaft fixedly connected to the ninth rotation element; and
a plurality of shafts each fixedly connected to any one or a combination of the remaining rotation elements of the first, second, third, and fourth planetary gear sets and configured to be selectively connected to a transmission housing,
wherein the plurality of shafts comprise:
a seventh shaft fixedly connected to the third rotation element, the seventh rotation element, and the tenth rotation element;
an eighth shaft fixedly connected to the second rotation element and the fourth rotation element; and
a ninth shaft fixedly connected to the twelfth rotation element.

9. The planetary gear train of claim 8, further comprising:
three clutches each of which is configured to selectively connect two shafts to each other among the nine shafts; and
three brakes each of which is configured to selectively connect the transmission housing to another shaft of the nine shafts that is not connected to the input shaft or the output shaft.

10. The planetary gear train of claim 9, wherein the three clutches comprise:
a first clutch disposed between the sixth shaft and the second shaft;
a second clutch disposed between the first shaft and the fifth shaft; and
a third clutch disposed between the first shaft and the third shaft, and wherein the three brakes comprise:
a first brake disposed between the eighth shaft and the transmission housing;
a second brake disposed between the seventh shaft and the transmission housing; and
a third brake disposed between the ninth shaft and the transmission housing.

11. The planetary gear train of claim 9, wherein the three clutches comprise:
a first clutch disposed between the sixth shaft and the fourth shaft;
a second clutch disposed between the first shaft and the fifth shaft; and
a third clutch disposed between the first shaft and the third shaft, and wherein the three brakes comprise:
a first brake disposed between the eighth shaft and the transmission housing;
a second brake disposed between the seventh shaft and the transmission housing; and
a third brake disposed between the ninth shaft and the transmission housing.

12. The planetary gear train of claim 8, wherein the first, second, and third rotation elements are a first sun gear, a first planet carrier, and a first ring gear respectively,
the fourth, fifth, and sixth rotation elements are a second sun gear, a second planet carrier, and a second ring gear respectively,
the seventh, eighth, and ninth rotation elements are a third sun gear, a third planet carrier, and a third ring gear respectively,
the tenth, eleventh, and twelfth rotation elements are a fourth sun gear, a fourth planet carrier, and a fourth ring gear respectively, and
the thirteenth, fourteenth, and fifteenth rotation elements are a fifth sun gear, a fifth planet carrier, and a fifth ring gear respectively.

13. The planetary gear train of claim 8, wherein the first, second, third, fourth, and fifth planetary gear sets are disposed in a sequence of the first, fourth, third, second, and fifth planetary gear sets from an engine side.

14. A planetary gear train of an automatic transmission for a vehicle, the planetary gear train comprising:
an input shaft configured to receive a torque from an engine;
an output shaft configured to output a torque;
a first planetary gear set including first, second, and third rotation elements;
a second planetary gear set including fourth, fifth, and sixth rotation elements;
a third planetary gear set including seventh, eighth, and ninth rotation elements;
a fourth planetary gear set including tenth, eleventh, and twelfth rotation elements;
a fifth planetary gear set including thirteenth, fourteenth, and fifteenth rotation elements;
a first shaft fixedly connected to the first rotation element and the input shaft;
a second shaft fixedly connected to the fourteenth rotation element and the output shaft;
a third shaft fixedly connected to the sixth rotation element and the thirteenth rotation element;
a fourth shaft fixedly connected to the eleventh rotation element and the fifteenth rotation element;
a fifth shaft fixedly connected to the fifth rotation element and the eighth rotation element;
a sixth shaft fixedly connected to the ninth rotation element and selectively connected to one of the second shaft and the fourth shaft;
a seventh shaft; an eighth; and a ninth shaft,
wherein each of the seventh, eighth and ninth shafts is fixedly connected to at least one of the remaining rotation elements of the first, second, third, and fourth planetary gear sets and is configured to be selectively connected to a transmission housing by any one of brakes.

15. The planetary gear train of claim 14, wherein each of the sixth shaft and the second shaft, the first shaft and the fifth shaft, and the first shaft and the third shaft are respectively connected each other by any one of clutches, and
wherein the seventh shaft is connected with the third rotation element, the seventh rotation element, and the tenth rotation element,
the eighth shaft is connected with the second rotation element and the fourth rotation element, and
the ninth shaft is connected with the twelfth rotation element.

16. The planetary gear train of claim 15, wherein the clutches comprise:
a first clutch disposed between the sixth shaft and the second shaft;
a second clutch disposed between the first shaft and the fifth shaft; and
a third clutch disposed between the first shaft and the third shaft, and
wherein the brakes comprise:
a first brake disposed between the eighth shaft and the transmission housing;
a second brake disposed between the seventh shaft and the transmission housing; and
a third brake disposed between the ninth shaft and the transmission housing.

17. The planetary gear train of claim 14, wherein each of the sixth shaft and the fourth shaft, the first shaft and the fifth shaft, and the first shaft and the third shaft are respectively connected to each other by any one of clutches, and
wherein the seventh shaft is fixedly connected to the third rotation element, the seventh rotation element, and the tenth rotation element,
the eighth shaft is fixedly connected to the second rotation element and the fourth rotation element, and
the ninth shaft is fixedly connected to the twelfth rotation element.

18. The planetary gear train of claim 17, wherein the clutches comprise:
a first clutch disposed between the sixth shaft and the fourth shaft;
a second clutch disposed between the first shaft and the fifth shaft; and
a third clutch disposed between the first shaft and the third shaft, and
wherein the brakes comprise:
a first brake disposed between the eighth shaft and the transmission housing;
a second brake disposed between the seventh shaft and the transmission housing; and a third brake disposed between the ninth shaft and the transmission housing.

19. The planetary gear train of claim 14, wherein the first, second, and third rotation elements are a first sun gear, a first planet carrier, and a first ring gear respectively, the fourth, fifth, and sixth rotation elements are a second sun gear, a second planet carrier, and a second ring gear respectively, the seventh, eighth, and ninth rotation elements are a third sun gear, a third planet carrier, and a third ring gear respectively, the tenth, eleventh, and twelfth rotation elements are a fourth sun gear, a fourth planet carrier, and a fourth ring gear respectively, and the thirteenth, fourteenth, and fifteenth rotation elements are a fifth sun gear, a fifth planet carrier, and a fifth ring gear respectively.

* * * * *